(12) United States Patent
Sasaki

(10) Patent No.: US 12,381,285 B2
(45) Date of Patent: Aug. 5, 2025

(54) POWER STORAGE DEVICE VALVE STRUCTURAL BODY

(71) Applicant: DAI NIPPON PRINTING CO., LTD., Tokyo (JP)

(72) Inventor: Miho Sasaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 196 days.

(21) Appl. No.: 17/604,004

(22) PCT Filed: Apr. 27, 2020

(86) PCT No.: PCT/JP2020/018048
§ 371 (c)(1),
(2) Date: Oct. 15, 2021

(87) PCT Pub. No.: WO2020/218623
PCT Pub. Date: Oct. 29, 2020

(65) Prior Publication Data
US 2022/0216565 A1 Jul. 7, 2022

(30) Foreign Application Priority Data
Apr. 26, 2019 (JP) ................................. 2019-086458

(51) Int. Cl.
*H01M 50/333* (2021.01)
*H01M 50/102* (2021.01)
*H01M 50/308* (2021.01)

(52) U.S. Cl.
CPC ....... *H01M 50/333* (2021.01); *H01M 50/102* (2021.01); *H01M 50/308* (2021.01)

(58) Field of Classification Search
CPC ............ H01M 50/333; H01M 50/102; H01M 50/308; H01M 50/317; H01G 11/18
See application file for complete search history.

(56) References Cited

U.S. PATENT DOCUMENTS

| | | | |
|---|---|---|---|
| 2014/0120387 A1 | 5/2014 | Kinuta et al. | |
| 2016/0036024 A1* | 2/2016 | Choi et al. | H01M 50/105 429/54 |
| 2018/0346763 A1 | 12/2018 | Nishijima et al. | |

FOREIGN PATENT DOCUMENTS

| | | |
|---|---|---|
| CN | 102969469 A | 3/2013 |
| CN | 108291124 A | 7/2018 |

(Continued)

OTHER PUBLICATIONS

Kakiuchi Takashi, "JPH09259842A English Translation", Oct. 3, 1997.*

(Continued)

*Primary Examiner* — Matthew T Martin
*Assistant Examiner* — Alexandra J Simmons
(74) *Attorney, Agent, or Firm* — Oliff PLC

(57) ABSTRACT

A valve structural body that is easy to attach to a container is for a power storage device, and includes a casing in which a passage through which gas generated inside of the container is discharged to the outside of the container is formed, and a valve mechanism that is accommodated in the casing and allows the gas to pass through the passage to the outside of the container via the passage if the internal pressure of the container has risen due to the gas generated inside of the container. The casing includes a first plane, and a second plane that is parallel to the first plane.

5 Claims, 13 Drawing Sheets

(56) References Cited

FOREIGN PATENT DOCUMENTS

| EP | 3905376 A1 | 11/2021 | | |
|---|---|---|---|---|
| GB | 2080492 A | 2/1982 | | |
| JP | S62-49863 U | 3/1987 | | |
| JP | H9-259842 A | 10/1997 | | |
| JP | H09259842 A | * 10/1997 | .......... | H01M 50/333 |
| JP | H11-283611 A | 10/1999 | | |
| JP | 2003-272969 A | 9/2003 | | |
| JP | 2003-272971 A | 9/2003 | | |
| JP | 2007-087922 A | 4/2007 | | |
| JP | 3992517 B2 | 10/2007 | | |
| JP | 2014-211994 A | 11/2014 | | |
| JP | 2016-031934 A | 3/2016 | | |
| JP | 2019-061850 A | 4/2019 | | |
| WO | 2013/146803 A1 | 10/2013 | | |
| WO | 2015/160134 A1 | 10/2015 | | |

OTHER PUBLICATIONS

Jan. 9, 2024 Office Action issued in Japanese Patent Application No. 2021-516337.
Sep. 10, 2019 Office Action issued in Japanese Patent Application No. 2019-086636.
Jun. 30, 2020 International Search Report issued in International Patent Application No. PCT/JP2020/018048.
Jun. 30, 2020 Written Opinion of the International Searching Authority issued in International Patent Application No. PCT/JP2020/018048.
Jan. 26, 2024 Office Action issued in Chinese Patent Application No. 202080031517.0.
Jul. 9, 2024 Partial Supplementary European Search Report issued in European Application No. 20795642.6.
Oct. 15, 2024 Extended European Search Report issued in European Application No. 20795642.6.

* cited by examiner

POWER STORAGE DEVICE VALVE STRUCTURAL BODY

TECHNICAL FIELD

The present invention relates to a power storage device valve structural body and a power storage device including the same.

BACKGROUND ART

Patent Literature 1 discloses a pouch-type lithium secondary battery. In this battery, a valve structural body for gas venting is attached to a peripheral edge seal portion that is formed along a peripheral edge of a sack containing a battery element so as to be sandwiched. This valve structural body can suppress deformation of the shape of the sack by discharging gas generated in the sack.

CITATION LIST

Patent Literature

Patent Literature 1: JP 2016-31934A

SUMMARY OF INVENTION

Technical Problem

Attachment of the valve structural body such as that shown in Patent Literature 1 to the peripheral edge seal portion is typically performed by sandwiching the valve structural body with a packaging material forming the sack and heat-sealing the valve structural body together with the packaging material. Also, typically, the valve structural body is transported to a processing position for performing heat sealing in a state of being gripped by a gripping tool or the like included on a jig, and is fixed at the processing position during the heat sealing. However, in the valve structural body of Patent Literature 1, a portion that protrudes from the peripheral edge seal portion to the outer portion of the sack has a circular column shape. Since this makes it more difficult to firmly grip the valve structural body, for example, it can become more difficult to transport the valve structural body to the processing position or fix the valve structural body at the processing position, and consequently, it can be more difficult to attach the valve structural body to the container.

The present invention aims to provide a power storage device valve structural body that is easy to attach to the container, and a power storage device including the same.

Solution to Problem

A power storage device valve structural body according to an A1 aspect of the present invention is a valve structural body that is to be attached to a container, including: a casing in which a passage through which gas generated inside of the container is to be discharged to the outside of the container is formed; and a valve mechanism that is held in the casing and is configured to allow the gas to pass through to the outside of the container via the passage if an internal pressure of the container has risen due to the gas generated inside of the container. The casing includes a first plane, and a second plane that is parallel to the first plane.

A power storage device valve structural body according to an A2 aspect of the present invention is the valve structural body according to the A1 aspect, in which the casing includes a first portion that has a first ventilation path included in the passage and is fixed to the container such that the gas generated inside of the container flows into the first ventilation path.

A power storage device valve structural body according to an A3 aspect of the present invention is the valve structural body according to the A2 aspect, in which the casing further includes: a second portion that has a second ventilation path and holds the valve mechanism, the second ventilation path being included in the passage and being located toward the outside of the container relative to the first ventilation path; and a third portion that has a third ventilation path and includes the first plane and the second plane, the third ventilation path being included in the passage and being located toward the outside of the container relative to the first ventilation path.

A power storage device valve structural body according to an A4 aspect of the present invention is the valve structural body according to the A3 aspect, in which the third ventilation path is located toward the inside of the container relative to the second ventilation path.

A power storage device valve structural body according to an A5 aspect of the present invention is the valve structural body according to any one of the A2 aspect to the A4 aspect, in which the first portion has a non-circular shape in a view along the direction in which the first ventilation path extends.

A power storage device valve structural body according to an A6 aspect of the present invention is the valve structural body according to any one of the A2 aspect to the A5 aspect, in which the first portion includes a first wing-shaped portion that is formed thinner in a first direction from a central portion in a view along a direction in which the first ventilation path extends, and a second wing-shaped portion that is formed thinner in a second direction that is opposite to the first direction.

A power storage device valve structural body according to an A7 aspect of the present invention is the valve structural body according to the A6 aspect, in which the first plane and the second plane are parallel or orthogonal to the first direction and the second direction.

A power storage device according to an A8 aspect of the present invention includes: a container that is constituted by a packaging material and has an internal space and a peripheral edge seal portion that demarcates a peripheral edge of the internal space; a power storage device element that is accommodated in the internal space of the container; and a valve structural body that is attached to the peripheral edge seal portion. The valve structural body includes: a casing in which a passage through which gas generated inside of the container is to be discharged to the outside of the container is formed; and a valve mechanism that is held in the casing and is configured to allow the gas to pass through to the outside of the container via the passage if an internal pressure of the container has risen due to the gas generated inside of the container. The casing includes a first plane, and a second plane that is parallel to the first plane.

A power storage device according to an A9 aspect of the present invention is the power storage device according to an A8 aspect, in which the first plane and the second plane are parallel or orthogonal to the direction in which the peripheral edge seal portion extends.

A power storage device valve structural body according to a B1 aspect of the present invention is a valve structural body that is to be attached to a container, including: a casing in which a passage through which gas generated inside of the container is to be discharged to the outside of the container is formed; and a valve mechanism that is held in the casing and is configured to allow the gas to pass through to the outside of the container via the passage if an internal pressure of the container has risen due to the gas generated inside of the container. The casing includes: a first portion that has a first ventilation path included in the passage and is fixed to the container such that the gas generated inside of the container flows into the first ventilation path; a second portion that has a second ventilation path and holds the valve mechanism, the second ventilation path being included in the passage and being located toward the outside of the container relative to the first ventilation path; and a third portion that has a third ventilation path and includes a first plane and a second plane that is parallel to the first plane, the third ventilation path being included in the passage and being located toward the outside of the container relative to the first ventilation path. The second portion does not include a pair of planes that are parallel to each other when viewed in a direction in which the second ventilation path extends.

A power storage device valve structural body according to a B2 aspect of the present invention is the power storage device valve structural body according to the B1 aspect, in which the first portion includes a first wing-shaped portion that is formed thinner in a first direction from a central portion in a view along a direction in which the first ventilation path extends, and a second wing-shaped portion that is formed thinner in a second direction that is opposite to the first direction.

A power storage device valve structural body according to a B3 aspect of the present invention is a valve structural body to be attached to a container, including: a casing in which a passage through which gas generated inside of the container is to be discharged to the outside of the container is formed; and a valve mechanism that is held in the casing and is configured to allow the gas to pass through to the outside of the container via the passage if an internal pressure of the container has risen due to the gas generated inside of the container. The casing includes a first portion that has a first ventilation path included in the passage and is fixed to the container such that the gas generated inside of the container flows into the first ventilation path, and includes a first plane and a second plane that is parallel to the first plane at a portion located toward the outside of the container relative to the first portion. The first portion has a first wing-shaped portion that is formed thinner in a first direction from a central portion in a view along a direction in which the first ventilation path extends, and a second wing-shaped portion that is formed thinner in a second direction that is opposite to the first direction.

A power storage device valve structural body according to a B4 aspect of the present invention is the power storage device valve structural body according to the B3 aspect, in which the casing further includes: a second portion that has a second ventilation path and holds the valve mechanism, the second ventilation path being included in the passage and being located toward the outside of the container relative to the first ventilation path; and a third portion that has a third ventilation path and includes the first plane and the second plane, the third ventilation path being included in the passage and being located toward the outside of the container relative to the first ventilation path.

A power storage device valve structural body according to a B5 aspect of the present invention is the power storage device valve structural body according to the B1, B2, or B4 aspect, in which the third ventilation path is located toward the inside of the container relative to the second ventilation path.

The power storage device valve structural body according to a B6 aspect of the present invention is the power storage device valve structural body according to one of the B1 to B5 aspects, in which the first portion has a non-circular shape in a view along the direction in which the first ventilation path extends.

The power storage device valve structural body according to a B7 aspect of the present invention is the power storage device valve structural body according to one of the B2 to B4 aspects, in which the first plane and the second plane are parallel or orthogonal to the first direction and the second direction.

A power storage device according to a B8 aspect of the present invention includes: a container that is constituted by a packaging material, and has an internal space and a peripheral edge seal portion that demarcates a peripheral edge of the internal space; a power storage device element that is accommodated in the internal space of the container; and a valve structural body that is attached to the peripheral edge seal portion. The valve structural body includes: a casing in which a passage through which gas generated inside of the container is to be discharged to the outside of the container is formed; and a valve mechanism that is held in the casing and is configured to allow the gas to pass through to the outside of the container via the passage if an internal pressure of the container has risen due to the gas generated inside of the container. The casing further includes: a first portion that has a first ventilation path included in the passage and is fixed to the container such that the gas generated inside of the container flows into the first ventilation path; a second portion that has a second ventilation path and holds the valve mechanism, the second ventilation path being included in the passage and being located toward the outside of the container relative to the first ventilation path; and a third portion that has a third ventilation path and includes a first plane and a second plane that is parallel to the first plane, the third ventilation path being included in the passage and being located toward the outside of the container relative to the first ventilation path. The second portion does not include a pair of planes that are parallel to each other when viewed in a direction in which the second ventilation path extends.

A power storage device according to a B9 aspect of the present invention includes: a container that is constituted by a packaging material, and has an internal space and a peripheral edge seal portion that demarcates a peripheral edge of the internal space; a power storage device element that is accommodated in the internal space of the container; and a valve structural body that is attached to the peripheral edge seal portion. The valve structural body includes: a casing in which a passage through which gas generated inside of the container is to be discharged to the outside of the container is formed; and a valve mechanism that is held in the casing and is configured to allow the gas to pass through to the outside of the container via the passage if an internal pressure of the container has risen due to the gas generated inside of the container. The casing further includes a first portion that has a first ventilation path included in the passage and is fixed to the container such that the gas generated inside of the container flows into the first ventilation path, and includes a first plane and a second plane that is parallel to the first plane at a portion located toward the outside of the container relative to the first portion. The first portion includes a first wing-shaped portion that is formed thinner in a first direction from a central portion in a view along a direction in which the first ventilation path extends, and a second wing-shaped portion that is formed thinner in a second direction that is opposite to the first direction.

A power storage device according to a B10 aspect of the present invention is the power storage device according to the B8 or B9 aspect, in which the first plane and the second plane are parallel or orthogonal to the direction in which the peripheral edge seal portion extends.

Advantageous Effects of Invention

According to the present invention, a casing of a power storage device valve structural body includes a pair of planes (first plane and second plane) that are parallel to each other. Such a pair of planes can make it easier to hold the valve structural body and thereby, for example, it is possible to easily transport the valve structural body to the processing position or to easily fix the valve structural body to the processing position. As a result, it is possible to easily attach the valve structural body to the container.

DESCRIPTION OF EMBODIMENTS

Hereinafter, a power storage device valve structural body and a power storage device including the same according to an embodiment of the present invention will be described with reference to the drawings.

1. Overall Configuration of Power Storage Device

Figure 1:
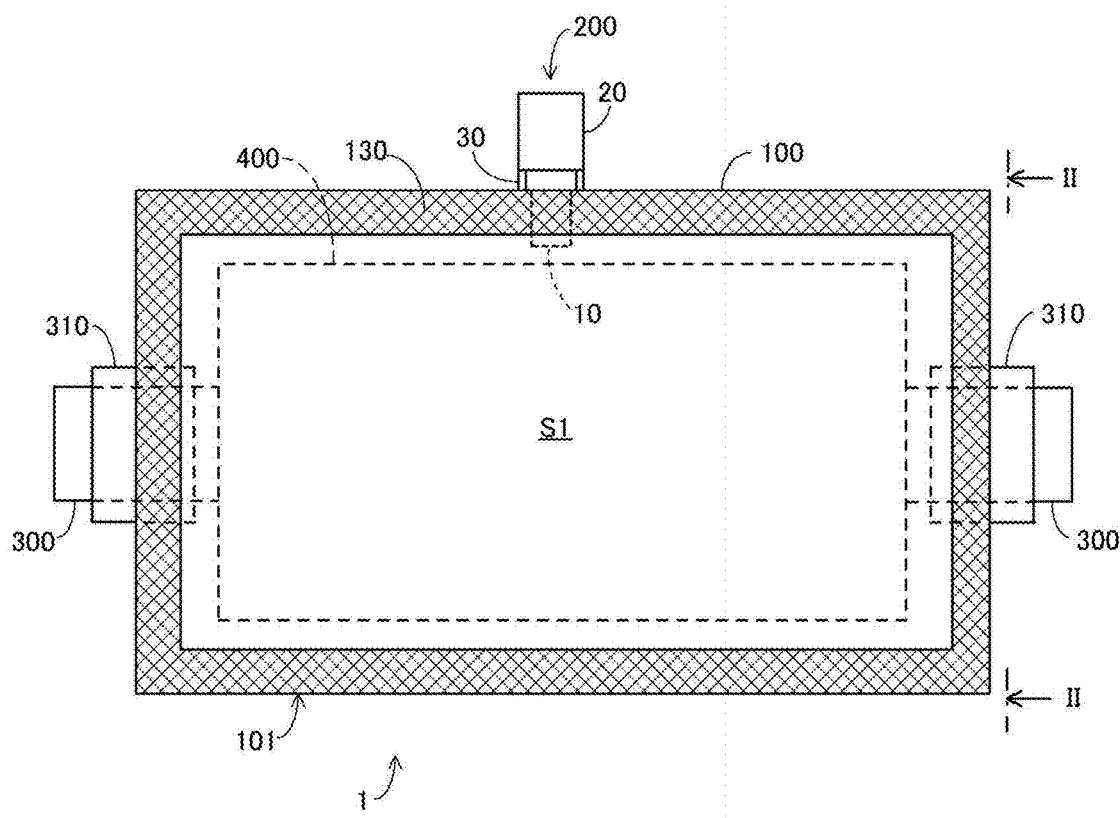
FIG. 1 is a plan view of a power storage device including a power storage device valve structural body according to an embodiment of the present invention.
Figure 2:
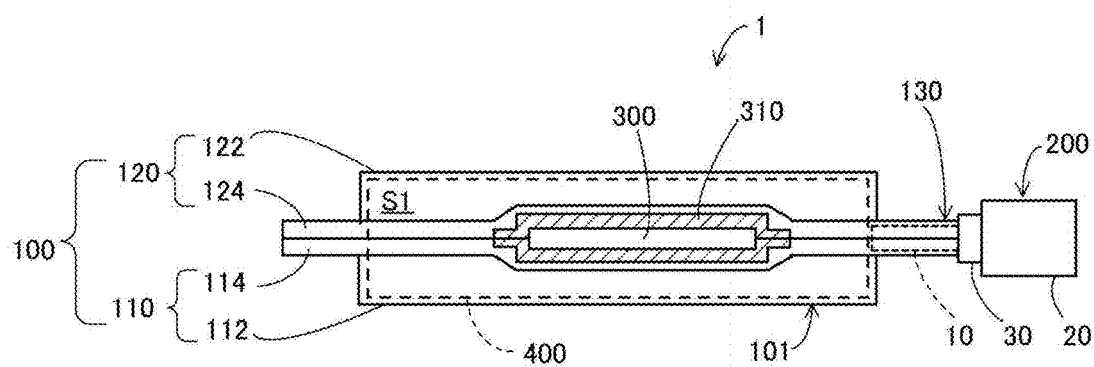
FIG. 2 is a cross-sectional view taken along line II-II in FIG. 1.

FIG. 1 shows a plan view of a power storage device 1 according to the present embodiment. FIG. 2 is a cross-sectional view taken along line II-II in FIG. 1. For the sake of reference, the portions that originally cannot be viewed from the outside are partially denoted by dotted lines in these drawings. Hereinafter, for the sake of convenience in the description, unless otherwise stated, the up-down direction of FIG. 1 will be referred to as "front and rear", the left-right direction will be referred to as "left and right", and the up-down direction of FIG. 2 will be referred to as "upper and lower". However, the orientation during use of the power storage device 1 is not limited thereto.

The power storage device 1 includes an accommodating body 101 and a power storage device element 400 accommodated therein. The accommodating body 101 includes a container 100, tabs 300 that are attached to the container 100, and tab films 310. The power storage device element 400 is accommodated in an internal space S1 of the container 100.

The container 100 is constituted by packaging materials 110 and 120. In an outer peripheral portion of the container 100 in a plan view, the packaging materials 110 and 120 are heat-sealed and welded together, whereby a peripheral edge seal portion 130 is formed. Also, the internal space S1 of the container 100, which is blocked from the external space, is formed by this peripheral edge seal portion 130. The peripheral edge seal portion 130 demarcates the peripheral edge of the internal space S1 of the container 100. Note that a mode such as heat welding from a heat source or ultrasonic welding is envisioned as the mode of heat sealing mentioned here. Either way, the peripheral edge seal portion 130 means a portion at which the packaging materials 110 and 120 are welded in one piece.

The packaging materials 110 and 120 are constituted by, for example, resin molded articles or films. The resin molded product here can be manufactured using a method such as injection molding, pressure molding, vacuum molding, or blow molding, and in-mold molding may also be performed in order to provide aesthetic quality and functionality. The type of the resin can be polyolefin, polyester, nylon, ABS, or the like. Also, the film herein is, for example, a plastic film that can be constructed using a method such as inflation or a T die method, or is a film obtained by stacking these plastic films on a metal foil. The film herein may also be stretched, or may be a single-layer film or a stacked film. Also, the stacked film herein may also be manufactured through coating, may be obtained by bonding multiple films using an adhesive or the like, or may be manufactured through multilayer stretching.

Although the packaging materials 110 and 120 can be formed in various ways as described above, in the present embodiment, they are made of laminate film. The laminate film can be a stacked body obtained by stacking a base material layer, a barrier layer, and a heat-sealable resin layer. The base material layer is a resin layer that functions as a base material of the packaging materials 110 and 120, typically forms the outer layer side of the container 100, and has an insulating property. The barrier layer is a metal layer that has a function of improving the strength of the packaging materials 110 and 120 as well as preventing at least moisture or the like from entering the power storage device 1, and is typically composed of an aluminum alloy or the like. The heat-sealable resin layer is typically composed of heat-sealable resin such as polyolefin, and forms the innermost layer of the container 100.

The shape of the container 100 is not particularly limited, and for example, can be sack-shaped (pouch-shaped). A three-side seal type, a four-side seal type, a pillow type, a gusset type, and the like are conceivable as the sack shape here. However, the container 100 of the present embodiment has a shape such as that shown in FIG. 2, and is manufactured by heat sealing a packaging material 110 molded into a tray shape, and a packaging material 120 that is similarly molded into a tray shape and is overlaid from above the packaging material 110, along an outer peripheral portion in a plan view. The packaging material 110 includes a rectangular ring-shaped flange portion 114 that corresponds to the outer peripheral portion in a plan view, and a molded part 112 that is continuous with the inner edge of the flange portion 114 and bulges downward therefrom. Similarly, the packaging material 120 includes a rectangular ring-shaped flange portion 124 that corresponds to the outer peripheral portion in a plan view, and a molded part 122 that is continuous with the inner edge of the flange portion 124 and bulges upward therefrom. The packaging material 110 and the packaging material 120 are overlaid on each other such that the respective molded parts 112 and 122 bulge in mutually opposite directions. In this state, the flange portion 114 of the packaging material 110 and the flange portion 124 of the packaging material 120 are heat-sealed so as to be integrated, and form the peripheral edge seal portion 130. The peripheral edge seal portion 130 extends over the entire outer periphery of the container 100 and is formed into a rectangular ring shape. Note that one of the packaging material 110 and the packaging material 120 may also be sheet-shaped.

For example, the power storage device element 400 is a power storage member such as a lithium ion battery (secondary battery) or a capacitor, and includes an electrolytic solution. When an abnormality occurs in the power storage device element 400, gas is generated in the internal space S1 of the container 100. Although one of a primary battery and a secondary battery may also be accommodated in the container 100, preferably, a secondary battery is accommodated therein. There is no particular limitation on the type of the secondary battery accommodated in the container 100, and examples thereof include a lithium ion battery, a lithium ion polymer battery, an all-solid-state battery, a lead storage battery, a nickel-hydrogen storage battery, a nickel-cadmium storage battery, a nickel-iron storage battery, a nickel-zinc storage battery, a silver oxide-zinc storage battery, a metal-air battery, a polyvalent cation battery, a condenser, or a capacitor. If the power storage device element 400 is a capacitor, gas is generated in the internal space S1 of the container 100 due to a chemical reaction in the capacitor. Also, if the power storage device 1 is an all-solid-state battery, the power storage device element 400 can include a solid electrolyte that can generate a gas. For example, if the solid electrolyte is sulfide-based, a sulfide-based gas can be generated.

The tabs 300 are a metal terminals that are used for input and output of power in the power storage device element 400. The tabs 300 are arranged separately at the end portions in the left-right direction of the peripheral edge seal portion 130 of the container 100, one forming a cathode-side terminal and the other forming an anode-side terminal. One end portion in the left-right direction of each tab 300 is electrically connected to an electrode (cathode or anode) of the power storage device element 400 in the internal space S1 of the container 100, and the other end portion protrudes outward from the peripheral edge seal portion 130. It is particularly preferable that the mode of the above-described power storage device 1 is used in, for example, an electrically driven vehicle such as an electric automobile or a hybrid automobile in which multiple power storage devices 1 are connected in series and used at a high voltage. Note that there is no particular limitation on the attachment positions of the two tabs 300 forming the cathode and anode terminals, and for example, they may also be arranged on the same side of the peripheral edge seal portion 130.

The metal material forming the tabs 300 is, for example, aluminum, nickel, copper, or the like. If the power storage device element 400 is a lithium ion battery, the tab 300 connected to the cathode is typically constituted by aluminum or the like, and the tab 300 connected to the anode is typically constituted by copper, nickel, or the like.

The tab 300 on the left side is sandwiched between the packaging materials 110 and 120 via the tab film 310 on the left end portion of the peripheral edge seal portion 130. The tab 300 on the right side is also sandwiched between the packaging materials 110 and 120 via the tab film 310 on the right end portion of the peripheral edge seal portion 130.

The tab film 310 is a so-called adhesive film, and is configured to adhere to both the packaging materials 110 and 120 and the tab 300 (metal). Due to the tab films 310 being interposed, the tabs 300 and the innermost layers (heat-sealable resin layers) of the packaging materials 110 and 120 can be fixed to each other even if they are different raw materials.

When gas is generated in the internal space S1 of the container 100 accompanying the operation of the power storage device 1, the pressure in the internal space S1 gradually rises. If the pressure in the internal space S1 rises excessively, there is a risk that the container 100 will rupture and the power storage device 1 will be broken. The accommodating body 101 includes a valve structural body 200 as a mechanism for preventing such a situation. The valve structural body 200 is a gas venting valve for adjusting the pressure in the internal space S1 and is attached to the peripheral edge seal portion 130 of the container 100. Hereinafter, the configuration of the valve structural body 200 will be described in detail.

2. Configuration of Valve Structural Body

Figure 3:
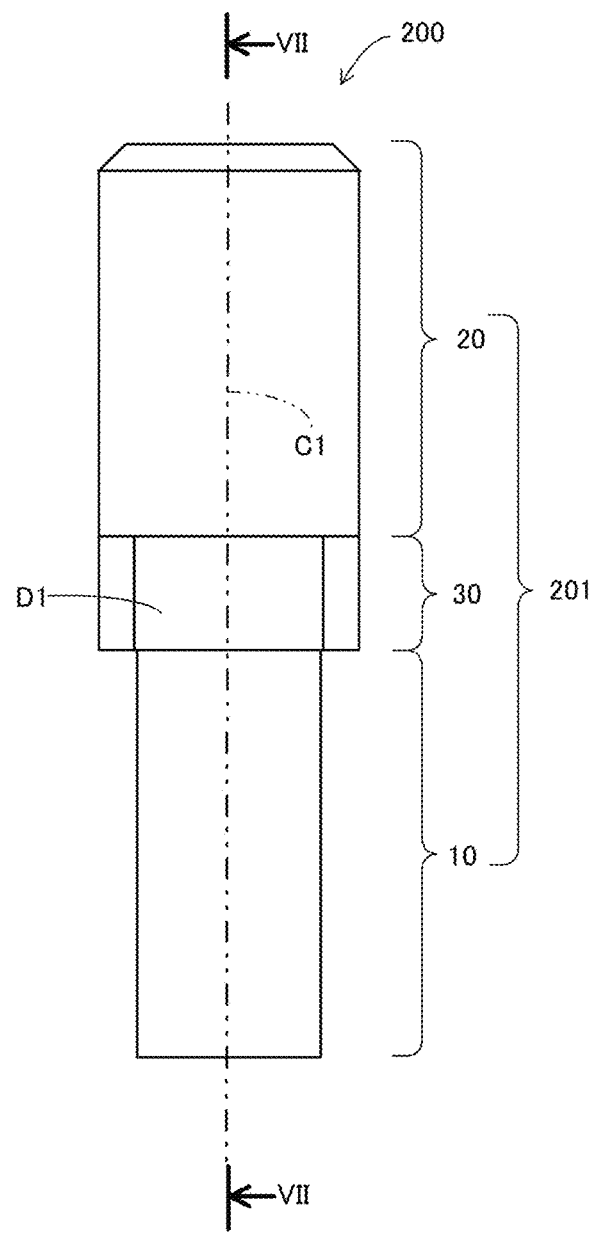
FIG. 3 is a plan view of a valve structural body.
Figure 4:
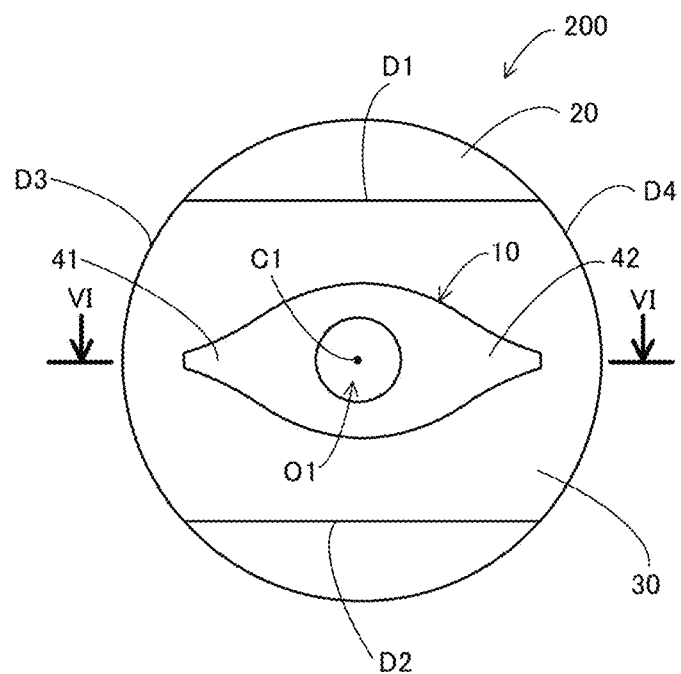
FIG. 4 is a diagram showing a rear-side view of the valve structural body.
Figure 5:
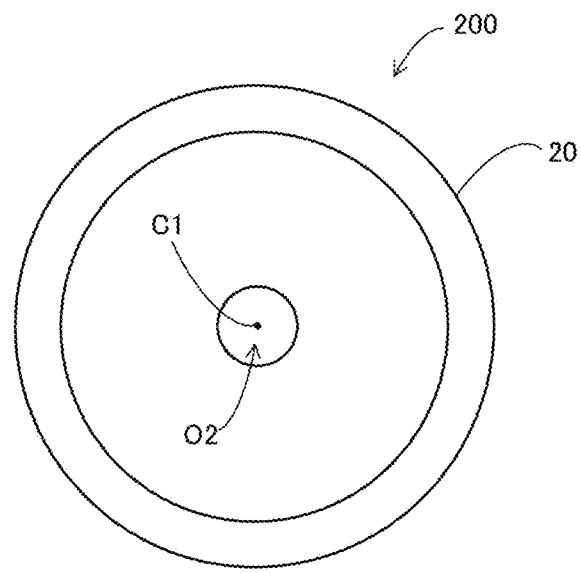
FIG. 5 is a diagram showing a front-side view of the valve structural body.

FIG. 3 is a plan view of the valve structural body 200. As shown in FIG. 3, the valve structural body 200 has a casing 201, and the casing 201 includes a first portion 10, a second portion 20, and a third portion 30. In the present embodiment, these portions 10 to 30 are arranged continuously in the direction from the inner portion of the container 100 to the outer portion (in a direction from the rear side to the front side) in the following order: the first portion 10, the third portion 30, and the second portion 20. FIG. 4 is a diagram of the valve structural body 200 as viewed from the first portion 10 side (from the rear side), and FIG. 5 is a diagram of the valve structural body 200 as viewed from the second portion 20 side (from the front side).

Figure 6:
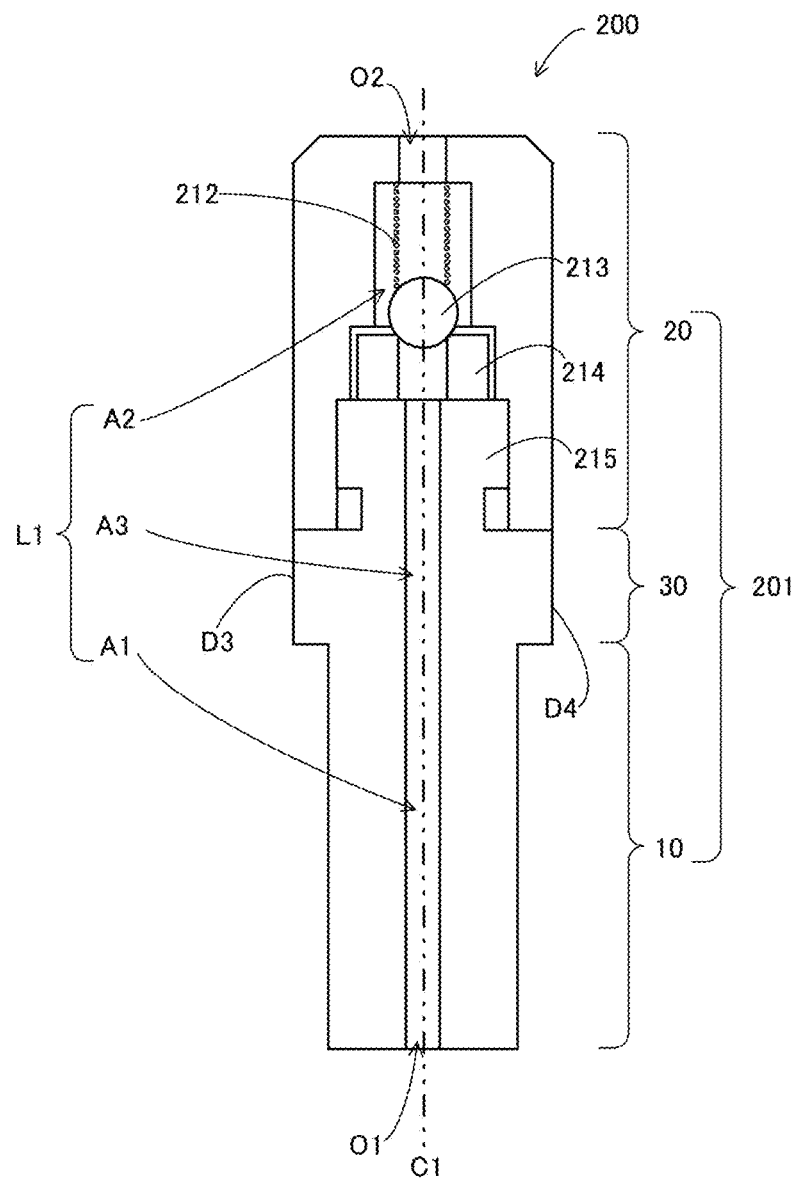
FIG. 6 is a cross-sectional view taken along line VI-VI in FIG. 4.
Figure 7:
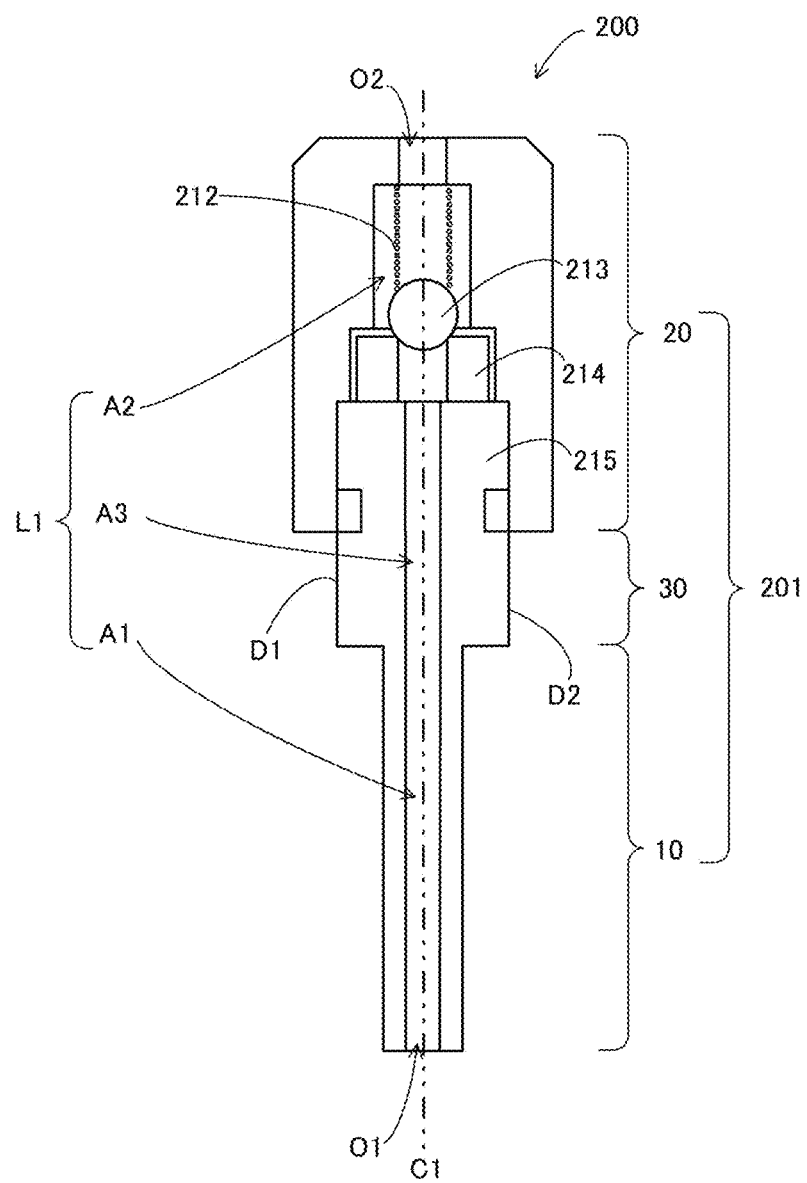
FIG. 7 is a cross-sectional view taken along line VII-VII in FIG. 3.

FIG. 6 is a cross-sectional view taken along line VI-VI in FIG. 4, and FIG. 7 is a cross-sectional view taken along line VII-VII in FIG. 3. As shown in FIGS. 6 and 7, the valve structural body 200 of the present embodiment is a check valve that can repeatedly vent gas, and in particular, is a ball-spring check valve. The valve structural body 200 is a relief valve that is switched between an open state and a closed state according to the pressure in the internal space S1. A passage L1 is formed inside of the casing 201. The passage L1 has an entrance O1 facing the internal space S1 of the container 100, and an exit O2 facing the external space. The passage L1 allows the internal space S1 of the container 100 to be in communication with the external space in the open state of the valve structural body 200, and can discharge the gas generated in the internal space S1 to the outside of the container 100. The valve structural body 200 enters the open state when the pressure in the internal space S1 has risen due to the gas generated in the internal space S1. On the other hand, the valve structural body 200 hermetically seals the internal space S1 from the external space in the closed state.

The first portion 10 is a portion for attaching the valve structural body 200 to the container 100. The first portion 10 is heat-sealed together with the packaging materials 110 and 120 during molding of the container 100. Due to this heat-sealing, the outer peripheral surface of the first portion 10 and the packaging materials 110 and 120 are welded and bonded together, and the first portion 10 is fixed to the peripheral edge seal portion 130 in a state of being sandwiched between the packaging materials 110 and 120 (see FIG. 2).

The third portion 30 is arranged on the outer side of the peripheral edge seal portion 130, and is not sandwiched between the packaging materials 110 and 120 (see FIGS. 1 and 2). Also, the second portion 20 arranged further outside with respect to the third portion 30 is also arranged on the outer side of the peripheral edge seal portion 130 and is not sandwiched between the packaging materials 110 and 120. As a result, the risk that the various parts constituting the later-described valve mechanism, which are held in the second portion 20, will break down due to deformation or the like in the heat generated when the first portion 10 is attached through heat-sealing to the container 100 is reduced.

The first portion 10, the second portion 20, and the third portion 30 extend parallel (includes being approximately parallel; the same applies below) to the front-rear direction on the same axis as each other. Here, a central axis used in common by these portions 10 to 30 is denoted by the reference sign C1. The first portion 10 has a first ventilation path A1, the second portion 20 has a second ventilation path A2, and the third portion 30 has a third ventilation path A3. These ventilation paths A1 to A3 also extend parallel to the front-rear direction on the same axis as each other, using the central axis C1 as a central axis. In the present embodiment, the entrance O1 and the exit O2 are arranged not on the outer peripheral surface of the casing 201 but on the side surfaces in the front-rear direction, and in particular, the central axis C1 that extends linearly in the front-rear direction passes through the centers of the entrance O1 and the exit O2. Although there is no limitation to this, the cross-section orthogonal to the central axis C1 of the ventilation paths A1 to A3 is circular. The ventilation paths A1 to A3 are in communication with each other, and form the passage L1 overall. The third ventilation path A3 is arranged toward the outside of the container 100 relative to the first ventilation path A1, and the second ventilation path A2 is arranged further toward the outside of the container 100 relative to the third ventilation path A3. In other words, the third ventilation path A3 is arranged toward the inside of the container 100 relative to the second ventilation path A2, and the first ventilation path A1 is arranged further toward the inside of the container 100 relative to the third ventilation path A3.

As shown in FIGS. 4 and 5, the outer shape of the second portion 20 is roughly a circular column shape in which the central axis C1 is the central axis. On the other hand, as shown in FIG. 4, the outer shape of the third portion 30 is roughly a shape obtained by cutting off a portion of a circular column in which the central axis C1 is the central axis. More specifically, the outer shape of the third portion 30 is roughly a shape obtained by cutting a circular column in which the central axis C1 is the central axis with a plane spaced apart from the central axis C1 by a predetermined distance, and further cutting with a plane at a location symmetrical to the plane with respect to the central axis C1. Accordingly, the third portion 30 has a pair of planes D1 and D2. Hereinafter, the plane indicated by D1 will be referred to as a first plane and the plane indicated by D2 will be referred to as a second plane in some cases. The first plane D1 and the second plane D2 are parallel (includes being approximately parallel; the same applies hereinafter) to each other. The first plane D1 and the second plane D2 are parallel (includes being approximately parallel; the same applies hereinafter) to the direction in which the central axis C1 extends. Also, in the present embodiment, the first plane D1 and the second plane D2 are parallel (includes being approximately parallel; the same applies hereinafter) to the direction in which the peripheral edge seal portion 130 extends. The outer peripheral surface of the third portion 30 is constituted by the first plane D1 and the second plane D2 and curved surfaces D3 and D4 that connect the planes D1 and D2. The curved surfaces D3 and D4 are circular arc shapes centered about the central axis C1 and overlap with the outer shape of the second portion 20 in a view in the direction in which the central axis C1 extends. The second portion 20 described above can be molded by cutting the outer peripheral surface of a circular tube-shaped member such that the pair of planes D1 and D2 are formed.

As shown in FIG. 4, the first portion 10 has an outer shape that is non-circular in a view along the direction in which the central axis C1 extends. More specifically, the first portion 10 has a first wing-shaped portion 41 that is formed thinner toward the left from the central portion in the left-right direction in a view along the direction in which the central axis C1 extends, and a second wing-shaped portion 42 that is formed thinner toward the right. Accordingly, in the present embodiment, the first portion 10 is thicker toward the central portion in the width direction (left-right direction) of the power storage device 1 and is thinner toward the end portion in the width direction (left-right direction) of the power storage device 1.

In the present embodiment, due to the wing-shaped portions 41 and 42, the outer peripheral surface of the first portion 10 has smoothly-curved surfaces on the lower half covered by the packaging material 110 and on the upper half covered by the packaging material 120. Also, due to the wing-shaped portions 41 and 42, the change in the thickness in the up-down direction of the power storage device 1 is smoother at the location at which a transition is made from the portion of the peripheral edge seal portion 130 at which the first portion 10 is not sandwiched to the portion of the peripheral edge seal portion 130 at which the first portion 10 is sandwiched, compared to the case where, for example, the first portion 10 is formed into a circular tube shape. As a result, unreasonable force is not applied to the packaging materials 110 and 120 in the peripheral side portion of the location at which the first portion 10 is attached at the peripheral edge seal portion 130, and therefore the first portion 10 can be strongly fixed to the peripheral edge seal portion 130.

As described above, in the present embodiment, the outer shapes of the first portion 10, the second portion 20, and the third portion 30 are all different shapes according to the roles allocated to the respective portions in a view along the direction in which the central axis C1 extends.

The second portion 20 holds a valve mechanism. The valve mechanism allows the gas that has passed through the first ventilation path A1 and the third ventilation path A3 to pass through toward the outer portion of the container 100 via the second ventilation path A2 if the pressure in the internal space S1 has risen due to the gas generated in the internal space S1 of the container 100. That is, a portion having a main structure for exhibiting a function of a gas venting valve of the valve structural body 200 is held in the second portion 20. In the present embodiment, a spring 212 serving as a valve mechanism, a ball 213, and a valve seat 214 are accommodated in the second ventilation path A2 inside of the second portion 20. An insertion portion 215 that is continuous with the third portion 30 is also accommodated in the second ventilation path A2. These portions 212 to 215 are arranged in the stated order from the exit O2 to the entrance O1 in the second ventilation path A2. Note that in the present embodiment, the second portion 20, the valve seat 214, and the insertion portion 215 are included as separate parts, but at least a portion thereof may also be included in one piece. Also, in the present embodiment, as shown in FIGS. 6 and 7, the insertion portion 215 is formed in one piece with the third portion 30 and the first portion 10, but at least a portion of these may also be formed as separate parts.

The valve seat 214 receives a ball 213 serving as the valve body biased from the outer side by the spring 212, and at this time, the closed state of the valve structural body 200 is formed. In the examples shown in FIGS. 6 and 7, the spring 212 is a coil spring, but there is no limitation to this, and for example, the spring 212 can also be a plate spring.

The first portion 10 is fixed to the peripheral edge seal portion 130 such that the gas generated in the internal space S1 of the container 100 flows into the first ventilation path A1. That is, the first ventilation path A1 inside of the first portion 10 is in communication with the internal space S1 of the container 100. Accordingly, when the pressure in the internal space S1, that is, the pressure in the first ventilation path A1 and the third ventilation path A3 that is in communication therewith, reaches a predetermined pressure, the gas that has flowed out from the internal space S1 and passed through the first ventilation path A1 and the third ventilation path A3 presses the ball 213 toward the exit O2. When the ball 213 is pressed and moves away from the valve seat 214, the spring 212 deforms, the ball 213 moves toward the exit O2, and the open state of the valve structural body 200 is formed. In this open state, the gas generated in the internal space S1 flows out toward the exit O2 via a gap formed between the ball 213 and the valve seat 214 and is discharged to the external space via the exit O2. In this manner, when the gas in the internal space S1 is discharged via the passage L1, the force pressing the ball 213 toward the exit O2 weakens, and the force by which the spring 212 biases the ball 213 toward the entrance O1 becomes greater there than. As a result, the shape of the spring 212 returns, and the closed state of the valve structural body 200 is formed once again.

The valve structural body 200 can prevent entrance of air into the internal space S1 of the container 100 in the closed state. On the other hand, in the open state as well, it is difficult for air to enter the internal space S1. This is because in the open state, a state in which the pressure in the internal space S1 is higher than or equal to the pressure in the external space is maintained. Accordingly, the valve structural body 200 can effectively prevent the entrance of air into the container 100 and can prevent deterioration of the power storage device element 400 due to moisture or the like included therein.

There is no particular limitation to the material constituting the portions of the valve structural body 200. To give a preferable example, the ball 213 can be made of a fluororesin, and the valve seat 214 can be made of fluororubber. Furthermore, the spring 212 can be made of a metal such as stainless steel, and the first portion 10, the second portion 20, the third portion 30, and the insertion portion 215 can be made of a metal such as an aluminum alloy, stainless steel, a steel plate, or titanium. The first portion 10 may also be constituted by a material that directly adheres to the innermost layers of the packaging materials 110 and 120. For example, the first portion 10 can be constituted by a material having the same heat-sealability as the innermost layers of the packaging materials 110 and 120, and for example, can be constituted by a resin such as polyolefin. If the first portion 10 cannot be constituted by the above-described materials for a reason such as heat resistance, or for example, if the first portion 10 is made of a metal, the first portion 10 and the innermost layers of the packaging materials 110 and 120 can be adhered to each other by a film that can adhere to both.

There is no particular limitation to the method for fixing the valve seat 214 and the casing 201, and for example, it is also possible to attach a valve seat 214 made of rubber on the casing 201 by baking. However, the valve seat 214 and the insertion portion 215 can also be adhered to each other with an adhesive. Although there is no particular limitation on the material of the adhesive herein as well, preferably, a curable type of adhesive can be used. In a preferable example of a case in which the valve seat 214 is made of fluororubber and the insertion portion 215 is made of a metal such as aluminum, the adhesive can be made of acid-modified polyolefin and epoxy resin. This kind of adhesive is excellent in that deterioration of the adhesion performance due to an electrolytic solution can be suppressed compared to the case where, for example, an adhesive made of modified silicone resin is used. Also, from the viewpoint of preventing opening of the valve structural body 200, it is possible to apply the adhesive as appropriate to various other locations as well. For example, the adhesive can be applied between the end surface on the rear side of the second portion 20 and the end surface on the front side of the third portion 30.

Speaking more generally, as the curable type of adhesive herein, it is preferable to include a resin including a polyolefin skeleton such as polyolefin or acid-modified polyolefin, and at least one type selected from a group consisting of a compound including an isocyanate group, a compound including a oxazoline group, and a compound including an epoxy group, and it is particularly preferable to include acid-modified polyolefin and at least one type selected from a group consisting of a compound including an isocyanate group and a compound including an epoxy group. It is possible to analyze that the resin constituting the adhesive layer formed by the adhesive includes a polyolefin skeleton through, for example, infrared spectroscopy, gas chromatography mass spectrometry, or the like. Also, it is preferable that a peak originating from maleic anhydride is detected when the resin constituting the adhesive layer is analyzed through infrared spectroscopy. For example, when the maleic anhydride-modified polyolefin is measured through infrared spectroscopy, the peak originating from maleic anhydride is detected near the wave number 1760 cm$^{-1}$ and near the wave number 1780 cm$^{-1}$. If the adhesive layer is a layer constituted by maleic anhydride-modified polyolefin, the peak originating from the maleic anhydride is detected when measured through infrared spectroscopy. However, when the acid modification level is low, the peak becomes small and is not detected in some cases. This case can be analyzed through nuclear magnetic resonance spectroscopy.

Specific examples of polyolefin include polyethylenes such as low-density polyethylene, medium-density polyethylene, high-density polyethylene, and linear low-density polyethylene; ethylene-α olefin copolymer; polypropylenes such as homopolypropylene, a block copolymer of polypropylene (e.g., a block copolymer of propylene and ethylene), or a random copolymer of polypropylene (e.g., a random copolymer of propylene and ethylene); propylene-α olefin copolymer; and ethylene-butene-propylene terpolymer. Among these, polypropylene is preferable. The polyolefin resin used in the case of a copolymer may be a block copolymer or a random copolymer. One type of these polyolefin-based resins may be used alone, or two or more types may be used together.

Also, the polyolefin may be cyclic polyolefin. The cyclic polyolefin is a copolymer of an olefin and a cyclic monomer, and examples of an olefin that is a constituent monomer of the cyclic polyolefin include ethylene, propylene, 4-methyl-1-pentene, styrene, butadiene, and isoprene. Also, examples of the cyclic monomer that is the constituent monomer of the cyclic polyolefin include a cyclic alkene such as norbornene; and a cyclic diene such as cyclopentadiene, dicyclopentadiene, cyclohexadiene, and norbornadiene. Among these, a cyclic alkene is preferable, and norbornene is more preferable.

The acid-modified polyolefin is a polymer modified by block polymerizing or graft polymerizing polyolefin with an acid component. A copolymer obtained by copolymerizing the above-described polyolefin, or a polar molecule such as acrylic acid or methacrylic acid with the above-described polyolefin, a polymer such as cross-linked polyolefin, or the like can be used as the polyolefin to be acid-modified. Also, examples of the acid component to be used for acid modification include carbonic acid or an anhydride thereof, such as maleic acid, acrylic acid, itaconic acid, crotonic acid, maleic anhydride, or itaconic anhydride.

Also, the acid-modified polyolefin may be acid-modified cyclic polyolefin. The acid-modified cyclic polyolefin is a polymer obtained by copolymerizing a portion of a monomer constituting cyclic polyolefin instead of an acid component, or block polymerizing or graft polymerizing an acid component to cyclic polyolefin. The cyclic polyolefin to be acid modified is similar to that described above. Also, the acid component to be used for acid modification is the same as the acid component to be used for modification of the above-described polyolefin.

Preferable examples of the acid-modified polyolefin include polyolefin modified by carbonic acid or an anhydride thereof, polypropylene modified by carbonic acid or an anhydride thereof, maleic anhydride-modified polyolefin, and maleic anhydride-modified polypropylene.

Also, from the viewpoint of electrolytic solution resistance in particular, it is preferable that coating with a corrosion prevention agent is carried out and a corrosion prevention coating layer is formed on the outer surface of the first portion 10. Note that although this particularly applies to a case in which the first portion 10 is made of a metal such as aluminum, this can apply also to a case in which the first portion 10 is made of another material. This kind of coating can be carried out by immersing the first portion 10 in a corrosion prevention agent liquid, and thereafter drying, baking, or electrically attaching the corrosion prevention agent attached to the outer surface of the first portion 10. This makes it possible to form a corrosion prevention coating layer on the outer-side surface of the first portion 10 and on the inner-side surface facing the first ventilation path A1, and to prevent corrosion of the outer-side surface due to released gas and corrosion of the inner-side surface due to gas passing through the first ventilation path A1. Also, from the viewpoint of electrolytic solution resistance in particular, a similar coating may also be carried out on not only the first portion 10 but also on the outer surfaces of the third portion 30, the second portion 20, and the insertion portion 215, and a corrosion prevention coating layer may also be formed thereon. However, from the viewpoint of suppressing deterioration of the adhesion performance of the first portion 10 and the packaging materials 110 and 120 resulting from the electrolytic solution, it is significant that this kind of coating is carried out on the first portion 10 in particular. Although there is no particular limitation to the material of the corrosion prevention agent, a corrosion prevention agent with acid resistance is preferable, and the corrosion prevention coating layer can be formed through a phosphate chromate treatment or the like. Note that in the case where, for example, the portion at which the corrosion prevention coating layer is formed is made of metal, the electrolytic solution resistance mentioned in the present paragraph can mean corrosion resistance of the metal itself. Alternatively, if the first portion 10 is made of metal and a film is interposed between the first portion 10 and the innermost layer of the packaging materials 110 and 120, the electrolytic solution resistance mentioned here can mean a property of preventing the interface between the metal surface of the first portion 10 and the film from peeling off due to the electrolytic solution.

3. Method for Attaching Valve Structural Body

Figure 8A:
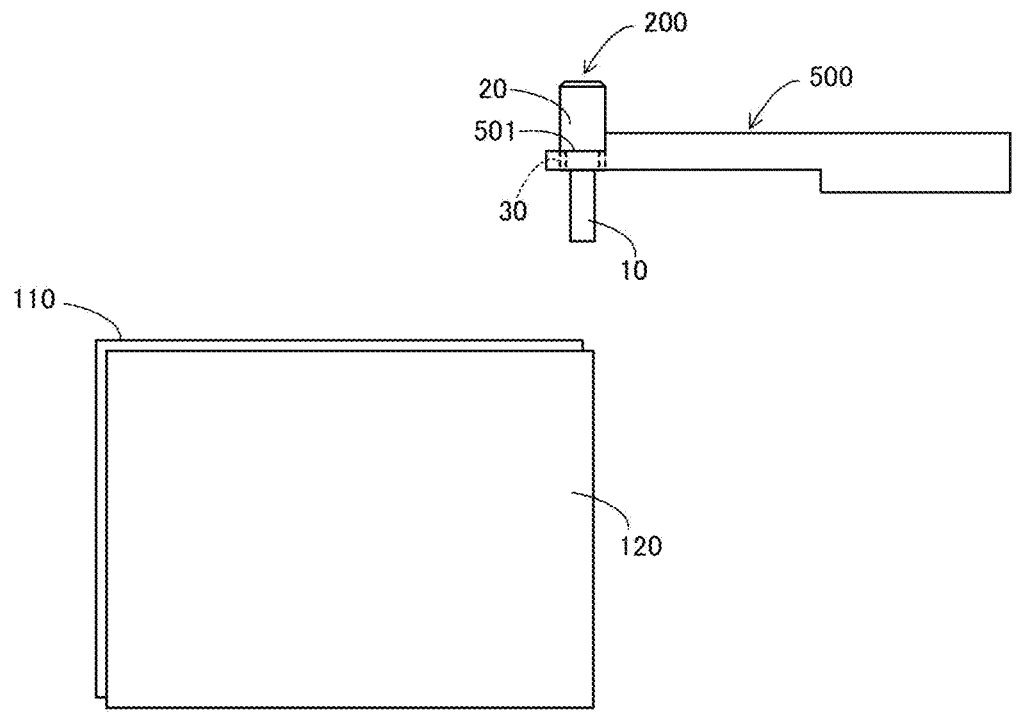
FIG. 8A is a diagram illustrating a method for attaching the valve structural body to the container.

Next, a method for attaching the valve structural body 200 to the container 100 will be described. First, the packaging materials 110 and 120 are fixed in a state of facing each other by a fixing tool (not shown). Also, the valve structural body 200 is gripped by a gripping tool 501 of a jig 500 (see FIG. 8A). At this time, the valve structural body 200 is gripped in a mode in which the holding tool 501 securely comes into contact with the first plane D1 and the second plane D2 of the third portion 30 and the third portion 30 is securely sandwiched by the gripping tool 501. Note that in FIGS. 8A to 8C, there is no particular illustration of the molded parts 112 and 122 of the packaging materials 110 and 120 in order to give focus to the description of the attachment of the valve structural body 200, but the molded parts 112 and 122 are formed as appropriate before, during, or after the attachment of the valve structural body 200.

Figure 8B:
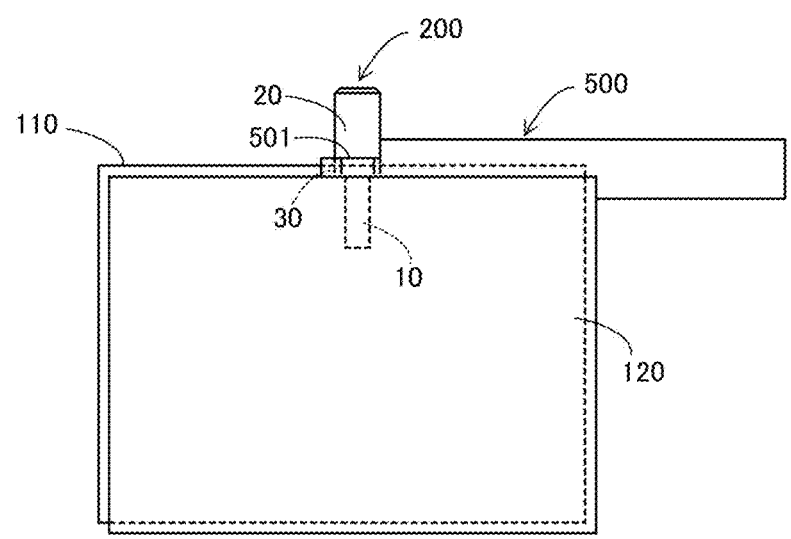
FIG. 8B is another diagram illustrating a method for attaching the valve structural body to the container.

In the above-described state, the jig 500 is driven, the valve structural body 200 gripped by the gripping tool 501 moves, and the first portion 10 is made to enter the gap between the packaging materials 110 and 120 that face each other (see FIG. 8B). At this time, the valve structural body 200 is moved such that the third portion 30 does not enter the same gap. Accordingly, the first portion 10 is sandwiched by the outer peripheral portions of the packaging materials 110 and 120. Also, at this time, the valve structural body 200 is moved such that the portion that is to be the peripheral edge seal portion 130 in the packaging materials 110 and 120 and the first plane D1 and the second plane D2 of the third portion 30 are parallel to each other.

Figure 8C:
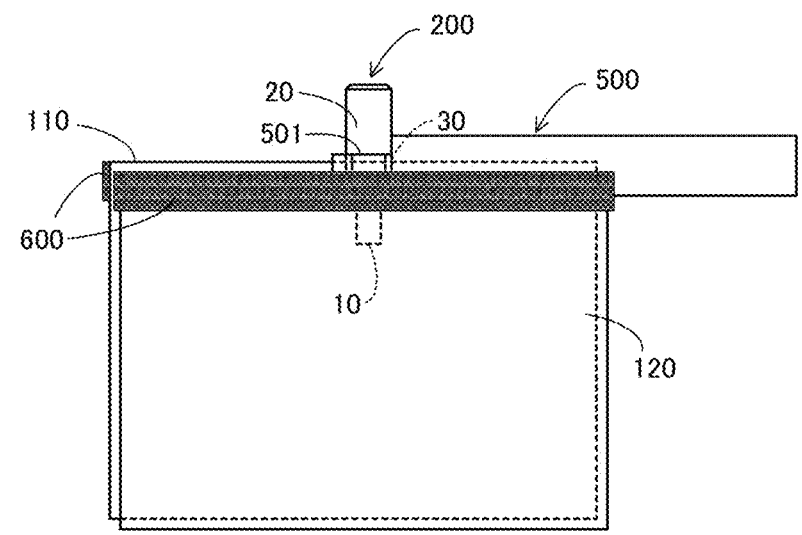
FIG. 8C is yet another diagram illustrating a method for attaching the valve structural body to the container.

In the state above, a pair of heated seal bars 600 sandwich the outer peripheral portions of the packaging materials 110 and 120 from the outer sides (see FIG. 8C). As a result, the outer peripheral portions of the packaging materials 110 and 120 receive the heat from the seal bars 600 and are welded, thus forming the peripheral edge seal portion 130. Due to the above, the valve structural body 200 is fixed to the peripheral edge seal portion 130 such that only the first portion 10 of the valve structural body 200 is sandwiched by the packaging materials 110 and 120. At this time, the wing-shaped portions 41 and 42 included on the first portion 10 are fixed without the line connecting the respective pointed end portions inclining with respect to the direction (left-right direction) in which the peripheral edge seal portion 130 extends. Thereafter, the pair of seal bars 600 withdraw to a predetermined position, and the gripping tool 501 releases the valve structural body 200 and withdraws to a predetermined position.

In the foregoing step, the gripping tool 501 can securely grip the valve structural body 200 using the pair composed of the first plane D1 and the second plane D2 that are parallel to each other. For this reason, the valve structural body 200 can be transported accurately to a desired position with respect to the packaging materials 110 and 120. Also, during heat sealing treatment, the valve structural body 200 can be securely fixed at a desired position with respect to the packaging materials 110 and 120. That is, the valve structural body 200 can be positioned accurately with respect to the container 100. Note that the positioning herein includes adjusting the phase about the central axis C1 of the valve structural body 200. That is, the angle about the central axis C1 of the first portion 10 with respect to the peripheral edge seal portion 130 of the container 100 can be adjusted accurately. With the above configuration, the attachment of the valve structural body 200 to the container 100 can be simplified.

4. Modified Examples

Although an embodiment of the present invention has been described above, the present invention is not limited to the above-described embodiment, and various modifications are possible without departing from the gist of the invention. For example, the following modifications are possible. Also, the gists of the following modified examples can be combined as appropriate.

4-1

The valve structural body 200 of the above-described embodiment was a ball-spring type, but there is no limitation to this, and for example, the valve structural body 200 can be a poppet type, a duckbill type, an umbrella type, a diaphragm type, or the like. Also, the valve structural body 200 of the above-described embodiment was a check valve that can repeatedly vent gas, but the valve structural body 200 may also be a breaking valve that can vent gas only once. It is also possible to include both a check valve and a breaking valve. Also, although the valve body included in the valve structural body 200 of the above-described embodiment was a spherical ball 213, there is no limitation to this kind of shape, and various shapes can be employed as long as the function of the valve body is carried out. For example, the valve body may be hemispherical, prolate spheroid-shaped, or oblate spheroid-shaped. If the valve body is hemispherical, the sphere surface side is received by the valve seat 214, and a columnar member may extend on the side opposite to the sphere surface from the central portion of the flat surface on the side opposite to the sphere surface. At this time, the position of the valve body in the casing 211 can be stabilized by forming the columnar member so as to be received by the inner side of the spring 212.

Figure 9A:
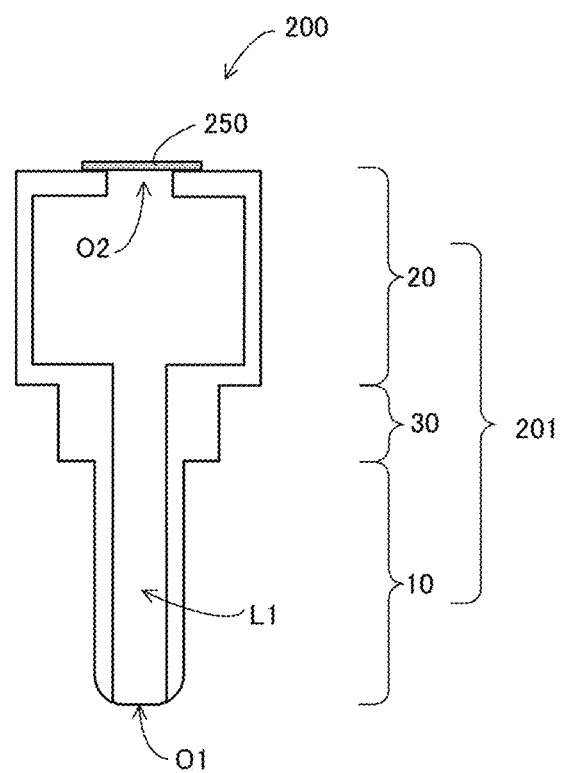
FIG. 9A is a cross-sectional view of a valve structural body according to a modified example.
Figure 9B:
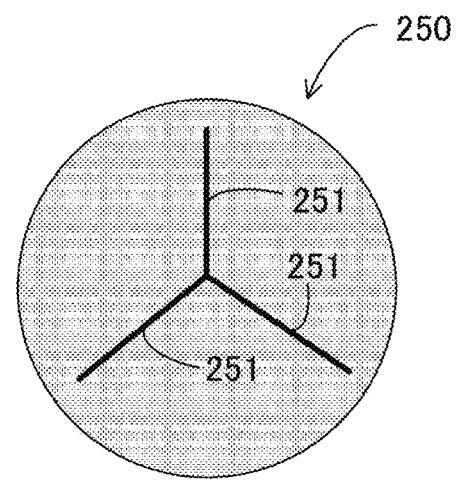
FIG. 9B is a diagram showing a breaking valve included in the valve structural body according to a modified example.

The breaking valve mentioned in the present modified example can be formed in various ways. For example, as shown in FIG. 9A, it is possible to form a breaking valve using a thin plate or the film 250 serving as the valve mechanism in which the casing 201 is held so as to close the passage L1 in the valve structural body 200. This breaking valve (the breaking valve will hereinafter be denoted by reference numeral 250) can be formed by, for example, attaching a laminate film to the casing 201 through heat sealing so as to cover the exit O2. In this example, when the pressure in the internal space S1 of the container 100 rises, the laminate film, which is the breaking valve 250, opens by delaminating. To give another example, the breaking valve 250 may be a thin plate made of metal such as aluminum, and as shown in FIG. 9B, a notch portion 251 that extends radially from near the center may also be formed in the same thin plate. The notch portion 251 does not penetrate through the breaking valve 250 in the thickness direction but is formed thinly compared to the other parts. In this case, with the breaking valve 250, when the pressure in the internal space S1 of the container 100 rises, the breaking valve 250 can open due to the breaking valve 250 breaking instead of the breaking valve 250 falling out of the casing 201.

4-2

Figure 10:
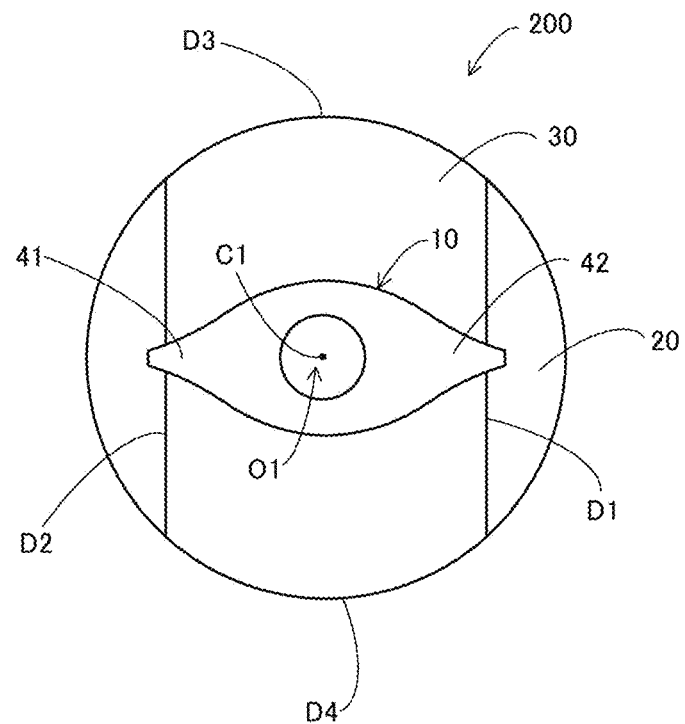
FIG. 10 is a rear-side view of a valve structural body according to another modified example.

The first plane D1 and the second plane D2 of the third portion 30 may not be parallel to the direction in which the peripheral edge seal portion 130 extends, and can face various directions. However, from the viewpoint of workability during attachment of the valve structural body 200 to the container 100, it is preferable that the first plane D1 and the second plane D2 are parallel to the direction (left-right direction) in which the peripheral edge seal portion 130 extends or are orthogonal (includes being approximately orthogonal; the same applies hereinafter) as shown in FIG. 10.

4-3

Figure 11:
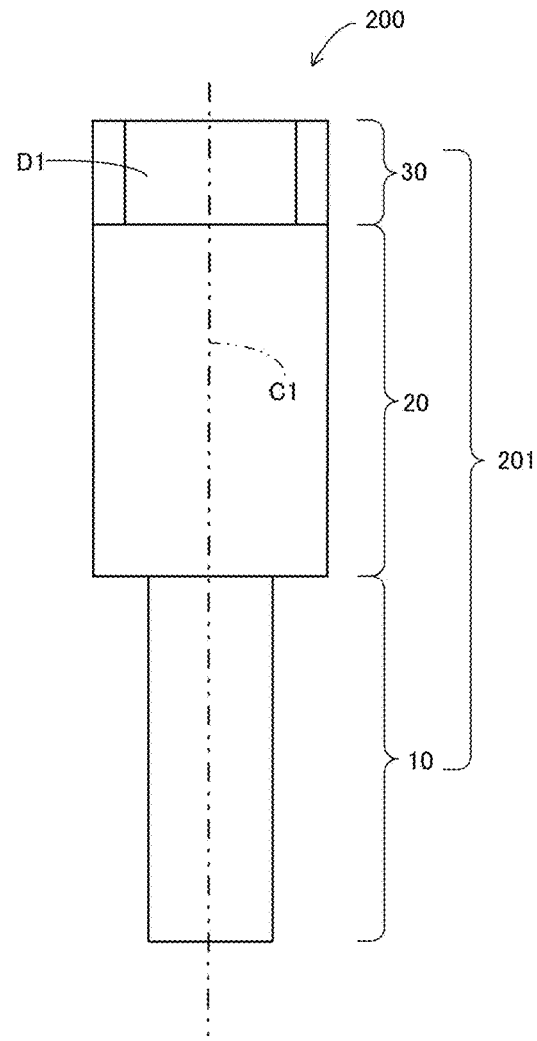
FIG. 11 is a plan view of a valve structural body according to yet another modified example.

In the above-described embodiment, the third portion 30 was arranged toward the inside of the container 100 relative to the second portion 20, but as shown in FIG. 11, the third portion 30 may also be arranged toward the outside of the container 100 relative to the second portion 20.

4-4

Figure 12A:
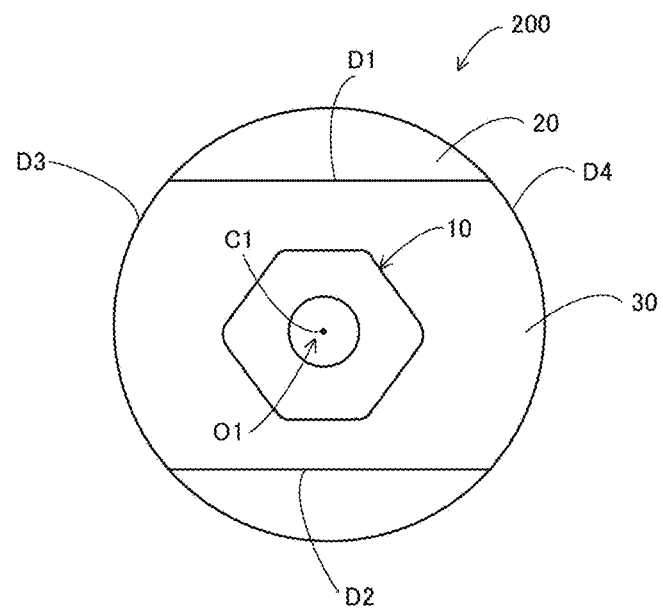
FIG. 12A is a rear-side view of a valve structural body according to yet another modified example.
Figure 12B:
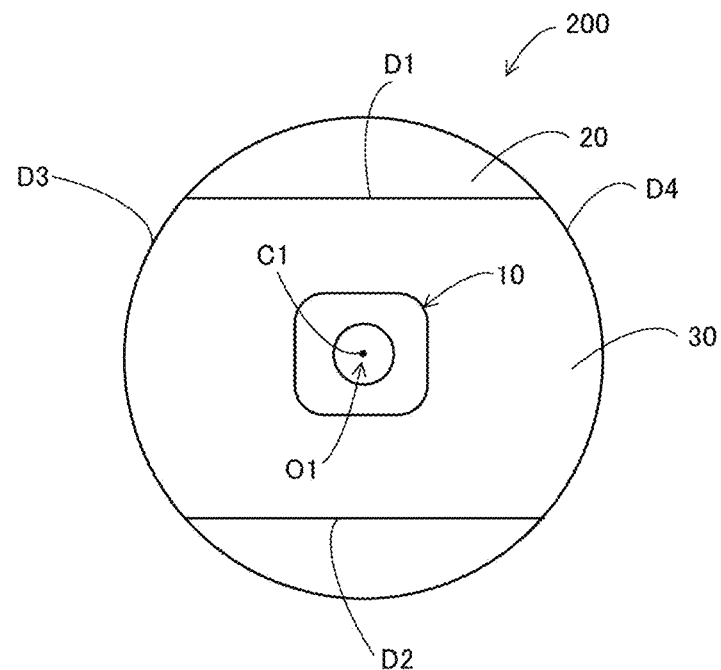
FIG. 12B is a rear-side view of a valve structural body according to yet another modified example.
Figure 12C:
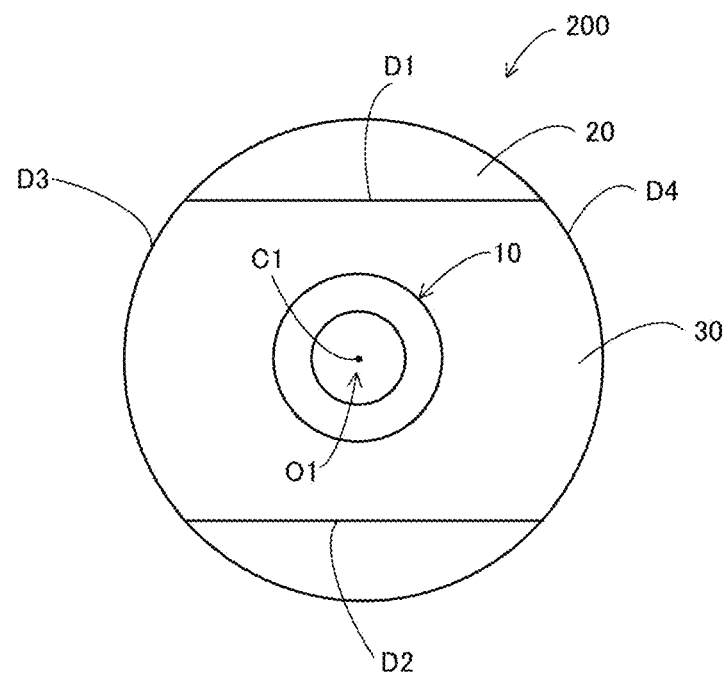
FIG. 12C is a rear-side view of a valve structural body according to yet another modified example.

The shape of the first portion 10 is not limited to the above description. For example, the outer shape of the first portion 10 may also be a non-circular shape as shown in FIGS. 12A and 12B in a view along the direction in which the first ventilation path A1 extends. Also, the outer shape of the first portion 10 may be circular as shown in FIG. 12C or elliptical in a view along the direction in which the first ventilation path A1 extends. If it is elliptical, it is preferable that the major axis extends parallel (includes being approximately parallel) to the left-right direction. That is, the first portion 10 may be a circular tube shape or an elliptical tube shape that extends along the central axis C1.

4-5

The shape of the second portion 20 is not limited to the above description, and the outer shape of the second portion 20 may also be a non-circular shape in a view along the direction in which the central axis C1 extends, and for example, may be an elliptical shape, or a triangle, a quadrilateral, a pentagon, or other polygon.

4-6

The shape of the third portion 30 is not limited to the above description. For example, as long as the third portion 30 has the pair of planes D1 and D2 that are parallel to each other, there is no particular limitation on the shapes of the other portions. For example, the curved surfaces D3 and D4 may be planar, and the outer shape of the third portion 30 may be quadrilateral in a view along the direction in which the central axis C1 extends. Alternatively, the outer shape of the third portion 30 may also be a regular hexagonal shape or a regular octagonal shape in a view along the direction in which the central axis C1 extends.

4-7

Figure 13A:
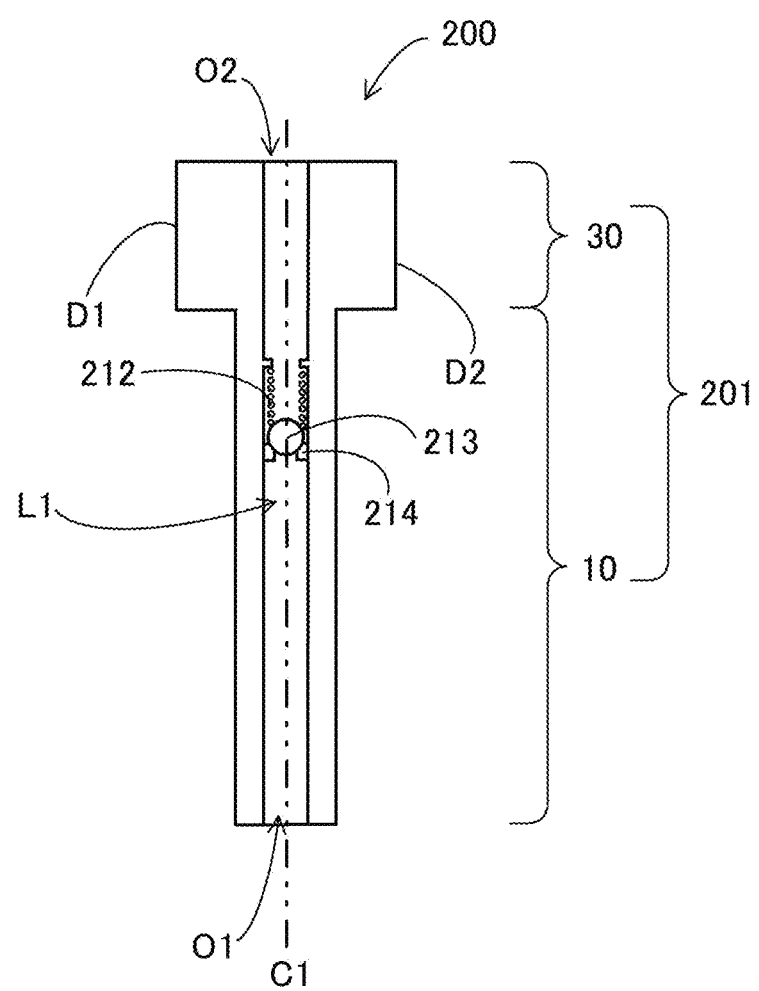
FIG. 13A is a cross-sectional view of a valve structural body according to yet another modified example.
Figure 13B:
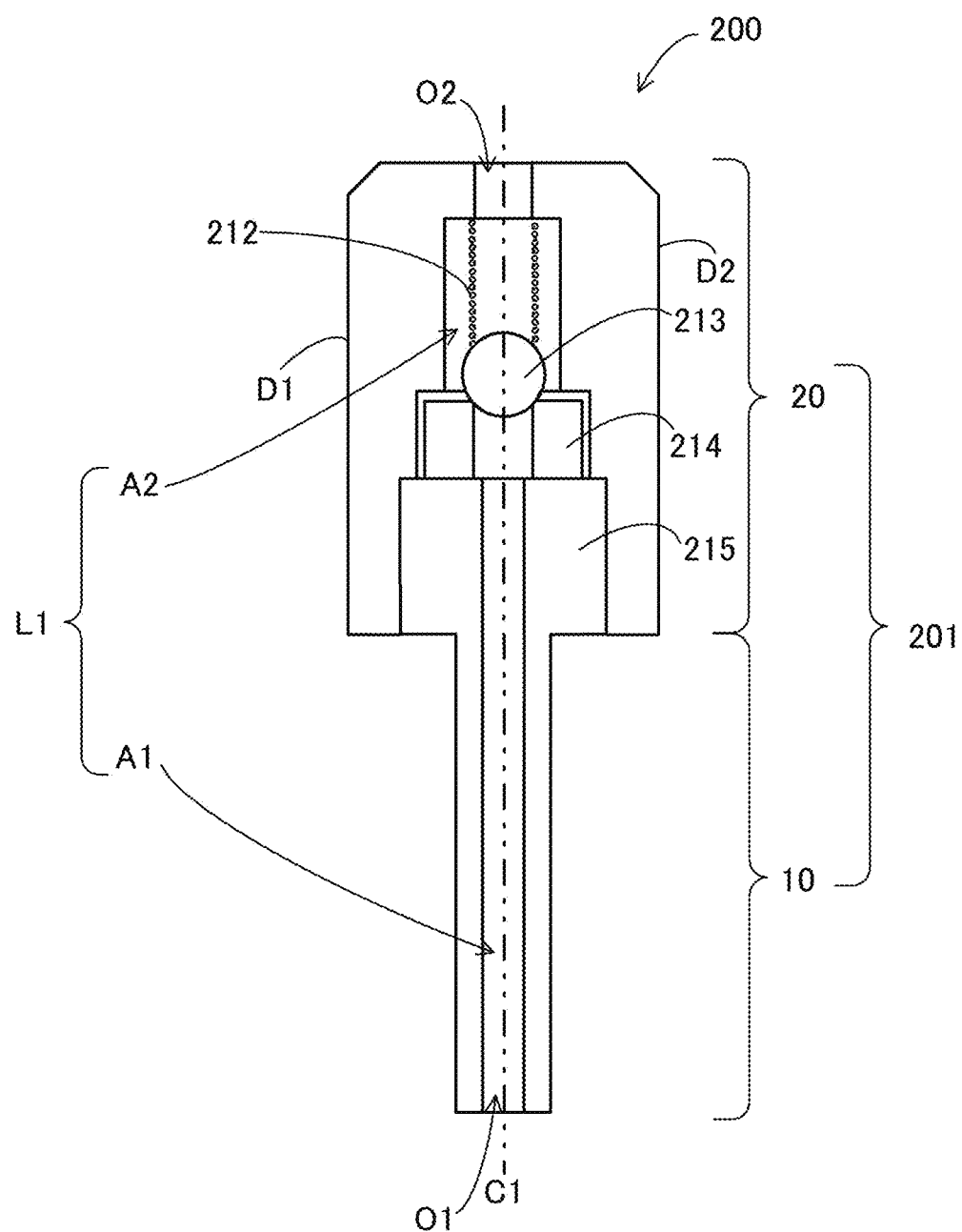
FIG. 13B is a cross-sectional view of a valve structural body according to yet another modified example.

In the above-described embodiment, the first portion 10 fixed to the peripheral edge seal portion 130, the second portion 20 that holds the valve mechanism, and the third portion 30 that includes the pair of planes D1 and D2 were formed as different parts that were independent in the direction in which the passage L1 extends. However, there is no limitation to this mode, and for example, as shown in FIG. 13A, the second portion 20 may be omitted and the valve mechanism may be moved to the first portion 10. Alternatively, as shown in FIG. 13B, the pair of planes D1 and D2 may also be formed on the outer surface of the second portion 20 that holds the valve mechanism and the third portion 30 may also be omitted.

4-8

An adhesive member may also be interposed between the first portion 10 of the valve structural body 200 and the peripheral edge seal portion 130 of the container 100 so as to simplify the fixing of the valve structural body 200 to the container 100 and improve the strength of the fixing. Although this mode has been mentioned simply in the description of the above-described embodiment, it will be described in more detail hereinafter.

Figure 14:
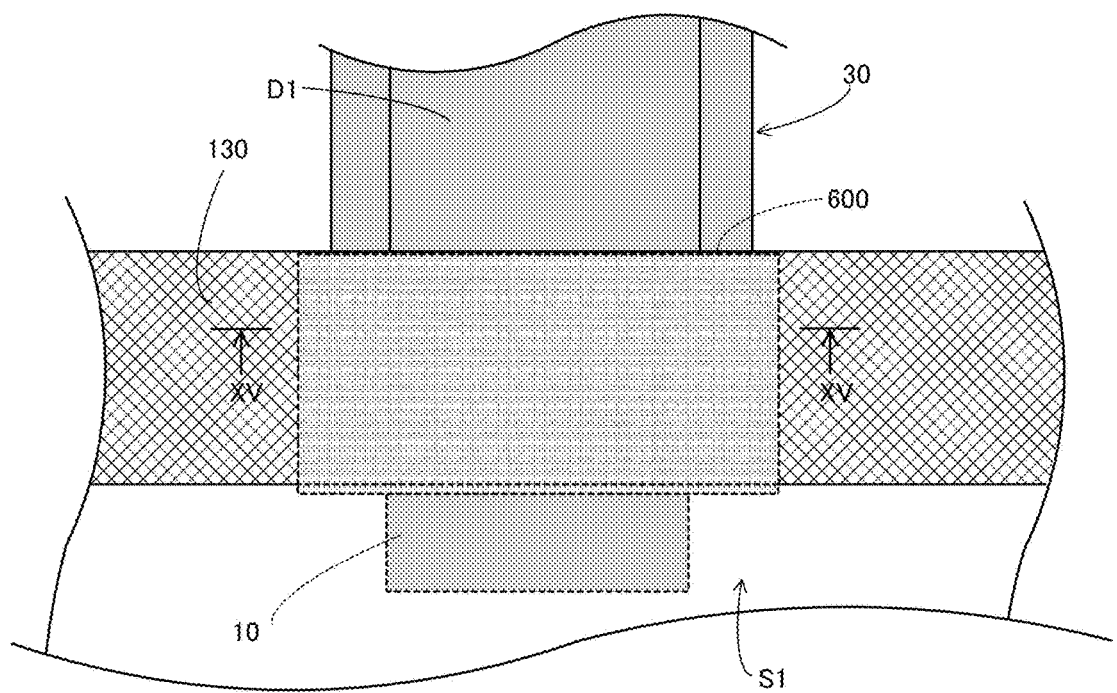
FIG. 14 is an enlarged plan view of a first portion of a valve structural body.
Figure 15:
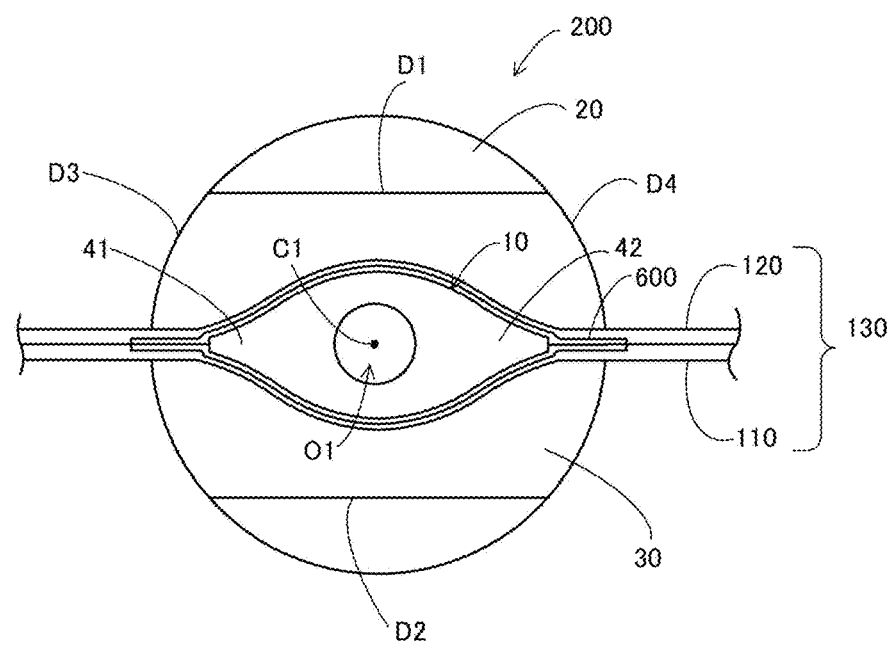
FIG. 15 is a cross-sectional view taken along line XV-XV in FIG. 14.

The adhesive member is a member that is adhesive to both the first portion 10 of the valve structural body 200 and the packaging materials 110 and 120 constituting the peripheral edge seal portion 130, and for example, the adhesive member can be formed as the adhesive film 600 shown in FIGS. 14 and 15. FIG. 14 is an enlarged plan view of the periphery of the first portion 10 of the valve structural body 200 and FIG. 15 is a cross-sectional view taken along line XV-XV. The first portion 10 is sandwiched by the packaging materials 110 and 120 via the adhesive film 600. Due to the adhesive film 600 being interposed in this manner, it is possible to strongly fix the outer surface of the first portion 10 and the innermost layer (heat-sealable resin layer) of the packaging materials 110 and 120, even if they have different raw materials. Note that normally, in FIG. 14, the portion of the adhesive film 600 that is sandwiched by the packaging materials 110 and 120 is not visible, but the position of that portion is indicated by a dotted line in FIG. 14 for reference. Also, in FIG. 14, the state in the internal space S1 is also partially indicated by a dotted line.

The adhesive film 600 is adhered using a mode such as heat sealing in a state of being sandwiched between the packaging materials 110 and 120 constituting the peripheral edge seal portion 130 together with the first portion 10 during the molding of the container 100. Accordingly, the outer surface of the first portion 10 and the innermost layer of the adhesive film 600 are welded together and bonded, and the innermost layer of the packaging materials 110 and 120 and the outermost layer of the adhesive film 600 are welded together and bonded.

It is preferable that the innermost layer of the adhesive film 600 is constituted by a material that easily adheres to the first portion 10. Similarly, it is preferable that the outermost layer of the adhesive film 600 is constituted by a material that easily adheres to the innermost layer of the packaging materials 110 and 120. In one example, the adhesive film 600 may be a single-layer film made of maleic anhydride-modified polypropylene (PPa). However, it is preferable that the adhesive film 600 is a layered film with a three-layer structure or a structure with three or more layers, in which a core material is included between the innermost layer and the outermost layer. In this case, the adhesive film 600 may also be a layered film of PPa, polyethylene naphthalate (PEN) serving as a core material, and PPa, or a layered film of PPa, polypropylene (PP) serving as a core material, and PPa. However, examples of particularly preferable core materials can include fibers such as polyamide fibers, polyester fibers, or carbon fibers, and among these, polyamide fibers can be used particularly preferably. This is because in this case, the adhesive resin is easily held between the fibers, the heat resistance (thermal contraction resistance, etc.) of the adhesive film itself can be further increased, and deformation of the adhesive film in various steps can be effectively prevented. Also, a resin that can adhere to metal, such as ionomer resin, modified polyethylene, or EVA can also be applied instead of PPa in the above-described example.

LIST OF REFERENCE NUMERALS

1 Power storage device
100 Container
110 Packaging material
120 Packaging material
130 Peripheral edge seal portion
101 Container body
200 Valve structural body
201 Casing
10 First portion
20 Second portion
30 Third portion
400 Power storage device element
41 First wing-shaped portion
42 Second wing-shaped portion
600 Adhesive film
L1 Passage
A1 First ventilation path
A2 Second ventilation path
A3 Third ventilation path
D1 First plane
D2 Second plane
O1 Entrance
O2 Exit
S1 Internal space

The invention claimed is:

1. A power storage device valve structural body to be attached to a container, the power storage device valve structural body comprising:
 a casing with a passage through which gas generated inside of the container is to be discharged to the outside of the container; and
 a valve mechanism that is held in the casing and is configured to allow the gas to pass through to the outside of the container via the passage if an internal pressure of the container has risen due to the gas generated inside of the container, wherein the casing includes:
- a first portion that has a first ventilation path included in the passage and is fixed to the container such that the gas generated inside of the container flows into the first ventilation path, the first portion including a first wing-shaped portion that is thinner in a first direction from a central portion in a view along a direction in which the first ventilation path extends, and a second wing-shaped portion that is thinner in a second direction that is opposite to the first direction,
- a second portion that has a second ventilation path and holds the valve mechanism, the second ventilation path being included in the passage and being located toward the outside of the container relative to the first ventilation path, and
- a third portion that has a third ventilation path and includes a first planar surface around a periphery of the third portion and a second planar surface around the periphery of the third portion and parallel to the first planar surface, the third ventilation path being included in the passage and located toward the outside of the container relative to the first ventilation path;
- the second portion does not include a pair of planes that are parallel to each other when viewed in a direction in which the second ventilation path extends;
- the second portion and the third portion have a common maximum diameter when viewed in the direction in which the second ventilation path extends; and
- the first wing-shaped portion and the second wing-shaped portion do not extend beyond the common maximum diameter when viewed in the direction in which the second ventilation path extends.

2. The power storage device valve structural body according to claim 1, wherein the third ventilation path is located toward the inside of the container relative to the second ventilation path.

3. The power storage device valve structural body according to claim 1, wherein the first portion has a non-circular shape in a view along the direction in which the first ventilation path extends.

4. The power storage device valve structural body according to claim 1, wherein the first planar surface and the second planar surface are parallel or orthogonal to the first direction and the second direction.

5. The power storage device valve structural body according to claim 2, wherein the first portion has a non-circular shape in a view along the direction in which the first ventilation path extends.

* * * * *